United States Patent [19]

Konishi

[11] Patent Number: 4,929,858

[45] Date of Patent: May 29, 1990

[54] STARTER WITH OVERRUNNING CLUTCH AND BALANCED ARMATURE

[75] Inventor: Keiichi Konishi, Hyogo, Japan

[73] Assignee: Mitsubishi Denki Kabushiki Kaisha, Tokyo, Japan

[21] Appl. No.: 354,562

[22] Filed: May 19, 1989

[30] Foreign Application Priority Data

Jun. 13, 1988 [JP] Japan ................................ 63-145169

[51] Int. Cl.[5] ......................... H02K 7/10; F16D 23/00

[52] U.S. Cl. ........................................ 310/83; 74/7 C; 192/84 A; 310/78; 310/90

[58] Field of Search ............................. 74/6, 7 A, 7 C; 192/84 A; 290/48; 123/179 M; 310/78, 80, 83, 90

[56] References Cited

U.S. PATENT DOCUMENTS 4,760,274 7/1988 Isozumi ................................ 290/48
4,816,712 3/1989 Tanaka .................................. 310/80
4,852,417 8/1989 Tanaka .................................. 74/7 C
4,852,708 8/1989 Parkhurst .............................. 74/7 C
4,853,570 8/1989 Isozumi et al. ....................... 310/78

FOREIGN PATENT DOCUMENTS 57-52773 9/1982 Japan .

*Primary Examiner*—Patrick R. Salce
*Assistant Examiner*—D. L. Rebsch
*Attorney, Agent, or Firm*—Sughrue, Mion, Zinn, Macpeak & Seas

[57] ABSTRACT

A starter comprising an electric motor which produces torque for staring an engine has a hollow outer member included in a one-way clutch and supported by a cover so as to be rotated together with the hollow armature shaft of the motor; a hollow inner member included in the clutch and surrounded by rollers is provided inside the outer member. A pinion shaft with a pinion capable of being engaged with the ring gear of the engine is engaged with the inside of the inner member by splines so that the pinion shaft is movable in the axial direction thereof; and an electromagnetic switch applies electricity to the motor and moves the pinion shaft in the axial direction thereof.

4 Claims, 2 Drawing Sheets

STARTER WITH OVERRUNNING CLUTCH AND BALANCED ARMATURE

BACKGROUND OF THE INVENTION

The present invention relates to a starter for starting the engine of a motor vehicle or the like.

FIG. 2 shows a longitudinally sectional view of a starter in prior U.S. application Ser. No. 146,924 by the present applicant. The starter comprises a dc motor, a rear cover 9, a front cover 10, a bearing 11, rollers 16, bearings 18 and 19, a pinion shaft 20, a stopper 21, a bearing 22, a spring 23, an electromagnetic switch 24, a moving assembly 26, a push spring 29, a third holder 30, a push spring 31 a steel ball 32, and long bolts 39.

The dc motor includes as armature 1, an armature core 2, an armature shaft 3, a commutator 4, brushes 5, an armature coil 6, permanent magnets 7, a yoke 8, and brush holders 12. The armature core 2 is press-fitted on the outside circumferential surface of the armature shaft 3. The armature shaft 3 is hollow and has wedge-shaped cams 3*a* formed on the inside circumferential surface of the shaft so as to be members of an overrunning clutch. The commutator 4 is fitted on the outside circumferential surface of the rear portion of the armature shaft 3. The brushes 5 are located in sliding contact with the commutation surfaces of the commutator 4, which extend perpendicularly to the axis of the armature shaft 3. The armature coil 6 is wound on the armature core 2 and connected to the commutator 4. Springs 5*a* are provided behind the brushes 5 to push them forward to keep the brushes in pressure contact with the commutation surfaces of the commutator 4. The permanent magnets 7 for applying a magnetic field to the armature 1 are secured to the inside circumferential surface of the yoke 8 which constitutes not only a magnetism passage but also the central cover of the starter. The front and rear ends of the yoke 8 are fitted to the front and the rear covers 10 and 9, respectively. The bearing 11 is fitted between the rear end of the armature shaft 3 and the rear cover 9 and support the armature shaft. The brush holders 12 house the brushes 5 and the springs 5*a*. A fixed contact member 13, which is connected to a terminal not shown in the drawings, is partly embedded in one of the molded holders 12. A terminal 14 to which a lead wire 5*b* for the positive-polarity brush 5 is welded, is attached to the fixed contact member 13 by a screw 15.

The rear cover 9 has an opening for fitting the bearing 11, and holes which are located outside the opening and have the same number as the brushes 5 so that the brushes are disposed in the holes and located in contact with the commutator 4.

The rollers 16 are provided at the cams 3*a* formed on the inside circumferential surface of the armature shaft 3, so that the rollers, the cams, an inner clutch member 17 and roller springs not shown in the drawings constitute the overrunning clutch.

The bearing 18 is fitted on the outside circumferential surface of the middle portion of the inner clutch member 17 and supports the armature shaft 3 at the front end thereof. The bearing 19 is fitted in the front cover 10 and supports the inner clutch member 17 at the front end thereof. Helical splines 17*a* are formed on the inside circumferential surface of the inner clutch member 17 and slidably engaged with helical splines 20*c* formed on the outside circumferential surface of the middle portion of the pinion shaft 20 on which a pinion 20*a* and a flange 20*b* for preventing dust and water from entering into the starter are provided near the front end of the pinion shaft. The helical splines 20*c* are slidable backward and forward relative to the other helical splines 17*a*.

The bearing 22 is fitted in the inner clutch member 17 and supports the pinion shaft 20 at the rear portion thereof. The spring 23 is provided between the bearing 22 and the stopper 21. When the pinion shaft 20 is moved forward in the axial direction thereof, the spring 23 is compressed by the stopper 21 so that the stopper comes into contact with the rear end 17*b* of the inner clutch member 17 to limit the forward movement of the opinion shaft.

The electromagnetic switch 24 is attached to the rear cover 9 by bolts 25, and functions so that when an ignition switch not shown in the drawing is turned on, the pinion shaft 20 is moved in the axial direction thereof and a movable contact member 28 is put into touch with the fixed contact member 13 to apply electric power from a battery to the dc motor. The movable contact member 28 is attached with interposed electric insulators 27*a* and 27*b* to the moving assembly 26 provided to push the pinion shaft 20 from behind. The moving assembly 26 includes an actuator 26*a*, a rod 26*b* calked to the actuator at their rear ends, a second holder 26*c* and a first holder 26*d*secured between the actuator and the rod and fitted with the movable contact member 28. The push spring 29 is provided around the rod 26*b* between the first and the second holders 26*d* and 26*c* to push the pinion shaft 20.

The electromagnetic switch 24 includes an electromagnetic coil 33 for driving the actuator 26*a*, a resinous bobbin 33*a* on which the coil is wound, a rear core 34*a*, a front core 34*b*, a cover 35, a nonmagnetic stopper 36, a seal 37, and a spring 38. The cores 34*a* and 34*b* and the cover 35 constitute a magnetism passage. The stopper 36 stops the actuator 26*a* when it is moved backward. The seal 37 is provided between the cover 35 and the plate 36 to prevent water from entering into the switch 24. The spring 38 is provided between the actuator 26*a* and the front core 34*b* to return the moving assembly 26 to the original position thereof when the ignition switch is turned off.

The push spring 31 is fitted in the third holder 30 to push the pinion shaft 20. The steel ball 32 is provided in the rear blind hole of the pinion shaft 20 and located between the front end of the third holder 30 and the innermost wall in the blind hole to transmit a thrusting force in the axial direction of the starter. The front and the rear covers 10 and 9 are coupled to each other by the long bolts 39.

The operation of the starter is described in detail from now on.

When the ignition switch is turned off, the electromagnetic coil 33 remains electrically de-energized so that only the force of the spring 38 acts to the actuator 26*a* to place the moving assembly 26 in the original position thereof and keep the actuator in contact with the plate 36. At that time, the fixed contact member 13 and the movable contact member 28 are out of touch with each other, the dc motor remains stopped, the pinion shaft 20 is located in the rearmost position thereof by the spring 23, and the rear of the flange 20*b* is in contact with the front end of the inner clutch member 17.

When the ignition switch is turned on, the electromagnetic coil 33 is electrically energized so that the actuator 26a is driven to move the moving assembly 26 forward and put the movable contact member 28 into touch with the fixed contact member 13. As a result, the armature coil 2 is electrically energized through the brushes 5 and the commutator 4 so that the dc motor is started. At the same time, the pinion shaft 20 is pushed forward by the push springs 29 and 31 of the moving assembly 26 so that the pinion 20a is engaged with a ring gear mounted on the flywheel of an engine, to start it. Immediately after the engine is started, the overrunning one-way clutch acts so that the pinion shaft 20 and the inner clutch member 17 are moved together with the ring gear but race relative to the armature 1. When the ignition key is turned off because of the completion of the starting of the engine, the electromagnetic switch 25 is electrically de-energized so that the moving assembly 26 is moved backward to the original position thereof by the spring 38 and the pinion 20 is moved backward to the original position thereof by the spring 23.

Although the armature 2 is supported at the front end thereof by the overrunning clutch and the sleeve bearing 18 made of metal and is supported at the rear end thereof by the bearing 11, the sleeve bearing is worn out in a long period of use so that the armature shaft 3 develops play and that the rollers 16 of the overrunning clutch are moved outward into a disengaged state by the centrifugal force at the time of the racing of the pinion shaft 20 and the inner clutch member 17 so as to put the cams 3a, the rollers and the inner clutch member out of contact with each other. For that reason, the inner clutch member 17 supported by the front cover 10 and the armature 1 become eccentric to each other so that the rotation of the starter is unbalanced. This is a problem.

SUMMARY OF THE INVENTION

The present invention was made in order to solve the abovementioned problem.

Accordingly, it is an object of the present invention to provide a starter in which the armature shaft of an electric motor does not eccentrically rotate even in the overrunning of a pinion shaft, so that the rotation of the armature of the motor is not unbalanced. In the starter, the pinion shaft extends into the hollow armature shaft. An outer member, which is included in a one-way clutch so as to be rotated together with the armature shaft, is supported by a cover. For that reason, even if the pinion shaft overruns, the armature shaft does not become eccentric, so that the rotation of the armature is not unbalanced.

DETAILED DESCRIPTION OF EXEMPLARY EMBODIMENT

An embodiment of the present invention is hereafter described in detail with reference to the drawings attached hereto.

Figure 1:
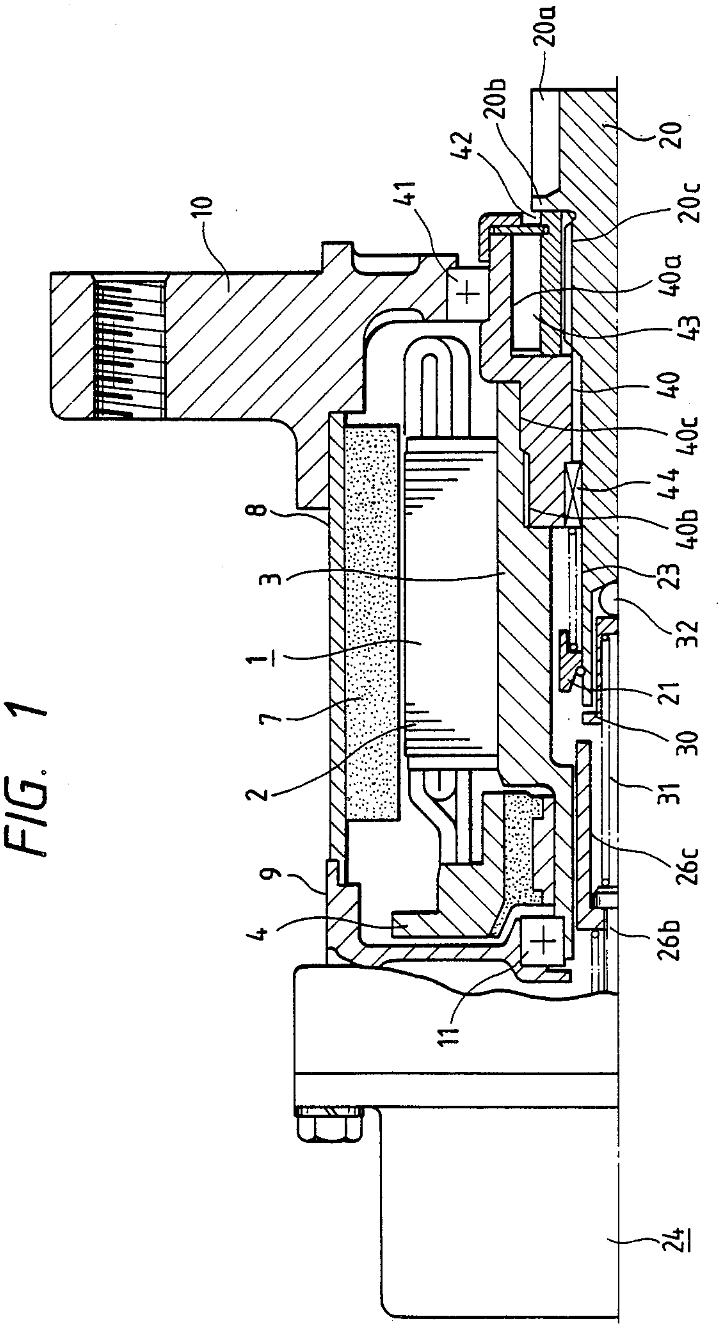
FIG. 1 shows a longitudinally-sectional partial view of a starter which is an embodiment of the present invention.
Figure 2:
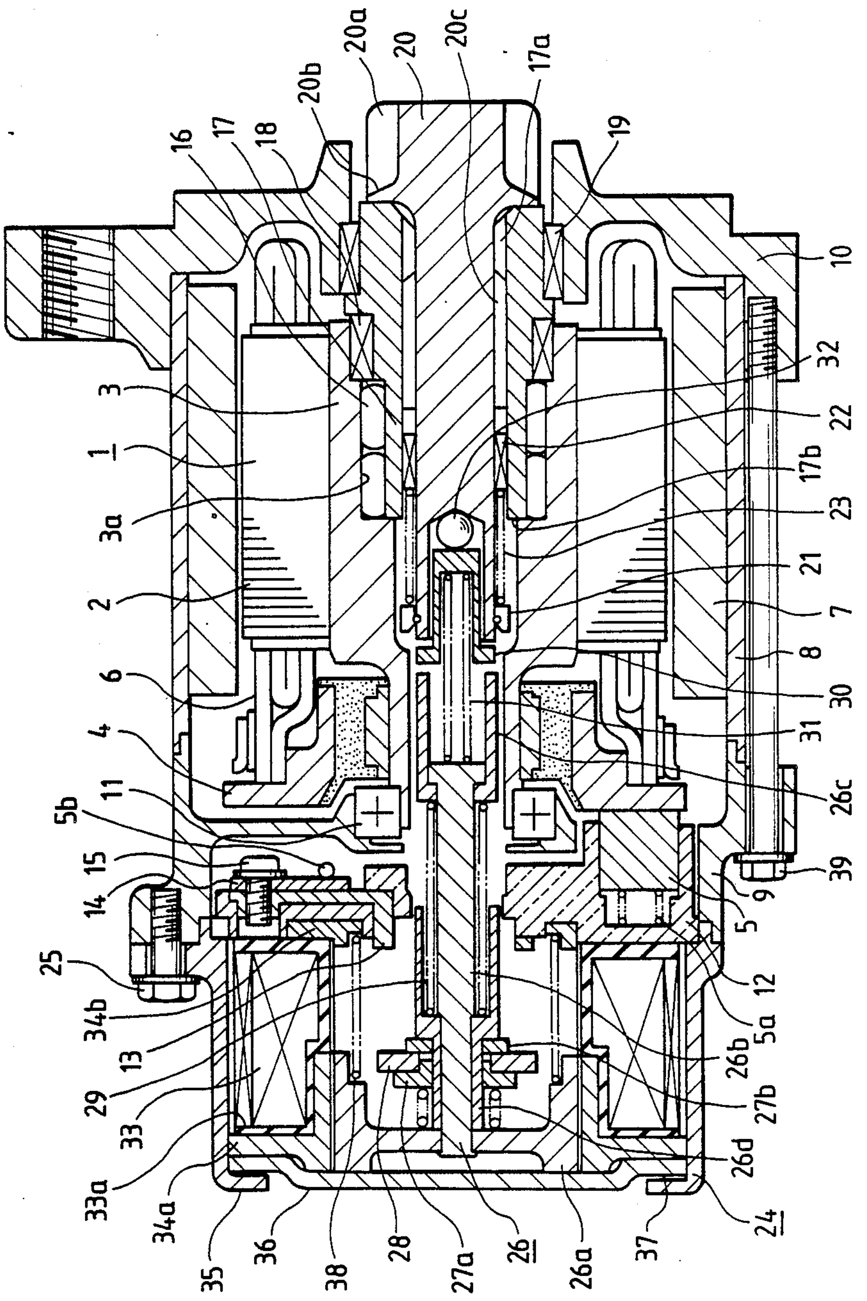
FIG. 2 shows a longitudinally sectional view of a conventional starter.

FIG. 1 shows a longitudinally-sectional partial view of the starter. The overrunning clutch, such as that of U.S. Pat. No. 4,852,708, includes an outer member 40 formed with wedge-shaped cams 40a and press-fitted at the rear portion 40c of the outer member in an armature shaft 3. Straight splines 40b are formed on the outer member 40 near the rear end thereof and engaged with the armature shaft 3 to rotate the outer member and the armature shaft together. A ball bearing 41 is press-fitted in a front cover 10. The outer member 40 is fitted in the ball bearing 41. The overrunning clutch also includes an inner member 42 which is hollow. Helical spines 17a are formed on the inside circumferential surface of the inner clutch member 42. Rollers 43 are provided between the outer and inner members 40 and 42 of the clutch. A bearing 44 is fitted in the outer member 40 at the rear end thereof and supports the pinion shaft 20. The other constitution of the starter is the same as that of the conventional starter shown in FIG. 2. The mutually corresponding portions of the starters are denoted by the same reference symbols in the drawings.

When the electromagnetic switch 24 of the starter which is the embodiment is electrically energized, the electric motor is started so that the armature shaft 3 is rotated. At that time, the torque of the shaft 3 is transmitted to the pinion shaft 20 through the overrunning clutch, and an actuation rod 26b is moved to push the pinion shaft forward to engage a pinion 20a with a ring gear to start an engine. As a result, the overrunning clutch overruns so that the pinion shaft 20 races relative to the armature shaft 3. Since the outer member 40 of the clutch is supported by the front cover 10, the outer member does not eccentrically rotate even in the overrunning of the clutch, so that the rotation of the armature 1 of the electric motor is not unbalanced.

Although the commutator 4 of the starter is of the transverse contact surface type in which the brush contact surfaces of the commutator extend perpendicularly to the axis of the starter, the commutator may be of another type.

Although permanent magnets 7 are provided as the field magnets of the electric motor of the starter, coils and cores around which the coils are wound may be provided instead of the permanent magnets.

Although the pinion shaft 20 and the pinion 20a are integrated with each other, the pinion shaft and the pinion may be engaged with each other by splines and provided with a stopper which keeps the pinion shaft and the pinion from separating from each other.

The present invention is not confined to the above-described embodiment and modifications, but may be practiced or embodied in other various ways without departing from the spirit or essential character thereof.

What is claimed is:

1. A starter comprising:

an electric motor which produces torque for starting an engine and has a hollow armature shaft;

a one-way clutch having an outer member and a hollow inner member said outer member being engaged with said armature shaft;

a pinion shaft which is provided with a pinion capable of being engaged with the ring gear of said engine and is engaged with the inside of said inner member by splines so that said pinion shaft is movable in the axial direction thereof;

an electromagnetic switch for applying electricity to said motor and moving said pinion shaft in the axial direction thereof;

a bearing supporting a rear end of said armature shaft;

a cover supporting said outer member in such a manner that said outer member is rotated together with the hollow armature shaft of said motor; and roller means provided between said outer member and said hollow inner member at positions surrounding said hollow inner member and operative to rotatably support a portion of said outer member.

2. A starter according to claim 1 wherein, a ball bearing is provided between said outer member and said cover for rotatably supporting said outer member.

3. A starter according to claim 1 wherein said outer member is press fit into the hollow of said armature shaft at one end thereof.

4. A starter according to claim 1 wherein said roller means comprises a plurality of rollers and said outer member comprises a plurality of wedge shaped cams engageable, respectively, with said rollers.

* * * * *